(12) United States Patent
Long

(10) Patent No.: US 7,808,997 B2
(45) Date of Patent: Oct. 5, 2010

(54) METHOD AND SYSTEM FOR FORWARDING DATA BETWEEN A PLURALITY OF PROVIDER ETHERNET NETWORKS

(75) Inventor: Hao Long, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 22 days.

(21) Appl. No.: 12/367,378

(22) Filed: Feb. 6, 2009

(65) Prior Publication Data

US 2009/0141730 A1 Jun. 4, 2009

Related U.S. Application Data

(63) Continuation of application No. PCT/CN2007/070424, filed on Aug. 6, 2007.

(30) Foreign Application Priority Data

Aug. 9, 2006 (CN) .................. 2006 1 0062046

(51) Int. Cl.
H04L 12/56 (2006.01)
(52) U.S. Cl. .................. 370/392; 370/401; 709/249
(58) Field of Classification Search .................. None
See application file for complete search history.

(56) References Cited

U.S. PATENT DOCUMENTS

| 7,046,671 | B2 | 5/2006 | Chang et al. | |
|---|---|---|---|---|
| 7,643,424 | B2 * | 1/2010 | Liu et al. ............. | 370/236.2 |
| 2004/0081203 | A1 | 4/2004 | Sodder et al. | |
| 2004/0184408 | A1 | 9/2004 | Liu et al. | |
| 2004/0264458 | A1 | 12/2004 | Six | |

(Continued)

FOREIGN PATENT DOCUMENTS

CN 1578252 A 2/2005

(Continued)

OTHER PUBLICATIONS

Allan et al., "Ethernet as Carrier Transport Infrastructure," *IEEE Communications Magazine*, 44(2): 134-140 (Feb. 2006).

(Continued)

*Primary Examiner*—Hong Cho
*Assistant Examiner*—Robert C Scheibel
(74) *Attorney, Agent, or Firm*—Leydig, Voit & Mayer, Ltd.

(57) ABSTRACT

The present invention discloses a method and a system for forwarding data between provider Ethernet networks, wherein a first provider Ethernet network is the first provider Ethernet network in a path through which a first data packet is transmitted, and a second provider Ethernet network is the last provider Ethernet network in the path. The method includes using network addresses of the first provider Ethernet network and the second provider Ethernet network as a source address and a destination address of an outer MAC header with which the first data packet is encapsulated when the first data packet is transmitted between the first provider Ethernet network and the second provider Ethernet network; and decapsulating the first data packet and forwarding the decapsulated data packet to the second client network after the first data packet is forwarded to the second provider Ethernet network.

18 Claims, 8 Drawing Sheets

U.S. PATENT DOCUMENTS

| | | |
|---|---|---|
| 2005/0220096 A1 | 10/2005 | Friskney et al. |
| 2006/0067317 A1 | 3/2006 | Engstrand et al. |
| 2006/0153213 A1* | 7/2006 | Chang et al. ................ 370/401 |
| 2007/0116045 A1 | 5/2007 | Mohan et al. |

FOREIGN PATENT DOCUMENTS

| | | |
|---|---|---|
| CN | 1671122 A | 9/2005 |
| WO | WO 03/096591 A2 | 11/2003 |
| WO | WO 2004/008696 A1 | 1/2004 |
| WO | WO 2004/102890 A1 | 11/2004 |

OTHER PUBLICATIONS

Elangovan, "Efficient Multicasting and Broadcasting in Layer 2 Provider Backbone Networks," *IEEE Communications Magazine*, 43(11): 166-170 (Nov. 2005).

* cited by examiner

METHOD AND SYSTEM FOR FORWARDING DATA BETWEEN A PLURALITY OF PROVIDER ETHERNET NETWORKS

CROSS-REFERENCE TO RELATED APPLICATIONS

This application is a continuation of International Patent Application No. PCT/CN2007/070424, filed Aug. 6, 2007, which claims priority to Chinese Patent Application No. 200610062046.1, filed Aug. 9, 2006, both of which are hereby incorporated by reference in their entirety.

FIELD OF THE INVENTION

The present invention relates to the technical field of Ethernet network, in particular to a method and a system for forwarding data between a plurality of provider Ethernet networks.

BACKGROUND OF THE INVENTION

Ethernet network technology not only has been widely applied in local area network environments of enterprises, but also interests telecommunication providers increasingly in building provider Ethernet networks, due to its advantages such as low cost, mature standard and flexible techniques. An important reason among others is that the Ethernet network technology has advantages such as low cost and statistical multiplexing function. However, due to limitations of conventional Ethernet network techniques, such as poor extensibility and interoperability, a series of problems occur when extending an Ethernet network application to a metropolitan area network.

In order to solve the extensibility of the Ethernet network, those skilled in the art proposed a technical scheme called MAC-in-MAC (Media Access Control). In the MAC-in-MAC technical scheme, when a data packet of a client arrives at a Provider Edge Bridge (PEB), the PEB encapsulates the data packet with an outer MAC header, a source address of which is a MAC address of the present PEB and a destination address of which is a MAC address of a destination PEB. To encapsulate with the outer MAC header, it is necessary for the PEB to perform address learning according to the source address of the outer MAC header of the received data packet to obtain mapping between a destination address of the client and the address of the destination PEB. The MAC-in-MAC technical scheme enables an internal bridge in a provider network to mask the MAC address of a network of the client.

On the basis of the MAC-in-MAC technical scheme, IEEE has established a new standard 802.1ah, and an 802.1ah-based network is referred to as a Provider Backbone Bridged Network (PBBN). However, the standard 802.1ah is under refinement, and there is no mature solution for forwarding data in a multi-PBBN environment yet.

At present, there exist two technical schemes on the basis of tiered interconnection and peer-to-peer interconnection in the conventional art for solving the data forwarding in the multi-PBBN environment. Hereunder, the two technical schemes will be further described in detail with reference to the accompanying drawings.

In a tiered interconnection model, a plurality of PBBNs are divided into several levels. The PBBN on an upper level serve as a service level for a PBBN on a lower level to provide a transparent transmission service for data transmission between the PBBNs on the lower levels.

With reference to FIG. 1, a Provider Bridged Network (PBN) on a lowest level is a provider network constructed on the basis of a Q-in-Q scheme in IEEE 802.1ad, and is adapted to provide an Ethernet network service for a client bridged network. The Q-in-Q scheme extends the Ethernet network and achieves isolation between a provider VLAN and a client VLAN. A typical message format in the PBN is as follows.

| C-DA | C-SA | S-TAG | C-TAG | Client-Data | FCS |
|------|------|-------|-------|-------------|-----|

Where the C-DA is the destination address of a client, namely, the Destination Address (DA) of data packets of the client; the C-SA is the source address of the client, namely, the Source Destination (SA) of the data packets of the client; the S-TAG is TAG of a VLAN in the PBN; the C-TAG is TAG of the VLAN carried in the data packets of the client; and the FCS is a frame check sequence.

The three PBBNs on the upper levels are a provider backbone Ethernet network constructed on the basis of the MAC-in-MAC scheme in the IEEE 802.1ah, and are mainly adapted to interconnect a plurality of the PBNs. A typical message format in the PBBN is as follows.

| B-DA | B-SA | B-TAG | I-TAG | Client-Data | FCS |
|------|------|-------|-------|-------------|-----|

Where the B-DA (Provider Backbone Destination Address) is the destination address of the provider backbone bridge, namely, the destination address for the outer MAC header; the B-SA (Provider Backbone Source Address) is the source address of the provider backbone bridge, namely, the source address for the outer MAC header; the B-TAG (Backbone VLAN TAG) is a tag of the backbone VLAN; the I-TAG (Service Instance TAG) is a tag of a service instance; and Client-Data here is a data packet of a complete format in the PBN.

According to planning, the three PBBNs can be divided into two levels of Level 1 and Level 2 by the provider. A plurality of PBBNs on Level 1 are connected by the PBBN on Level 2. Data is transmitted between the two PBBNs on Level 1 through the transparent transmission of the PBBN on Level 2. The PBBN on Level 2 treats a data packet from Level 1 at an ingress node as a payload. The data packet from Level 1 is encapsulated with the outer MAC header for the present level, and an Ethernet network data packet encapsulated is forwarded on the present level in accordance with the outer MAC header. At the egress node of Level 2, the Ethernet data packet is decapsulated to remove the outer MAC header for the present level, and is forwarded to the other PBBN on Level 1.

It can be seen from the above description of the tiered interconnection technical scheme that, it is necessary for the Ethernet data packet from Level 1 to be encapsulated with information of an outer MAC header for Level 2. That is, it is necessary for a data packet from a PBN to be encapsulated with information of two levels of MAC header, so that the number of levels of encapsulation is increased, which lowers data forwarding efficiency.

In order to avoid the lowering of the forwarding efficiency, a peer-to-peer interconnection solution can be used. With reference to FIG. 2, a schematic diagram of a peer-to-peer interconnection network is shown in FIG. 2, in which PBBN1 and PBBN2 are two provider backbone bridged networks connected in a peer-to-peer manner. In a peer-to-peer interconnection model, when a data packet enters PBBN1 through an ingress node PBB1 (Provider Backbone Bridge 1), PBB1 encapsulates the data packet with an outer MAC header. When the data packet passes through two PBBNs via PBB2 and PBB3, the Ethernet network data packet is not encapsulated with a new outer MAC header, instead, the old outer MAC header is replaced with a new outer MAC header. In order to prevent address information of specific network devices (such as PBB2 and PBB3) in the present provider Ethernet network from exposing to other provider Ethernet networks, the addresses contained in the outer MAC header used during the transmission of the data packet from PBB2 to PBB3 are usually not real addresses of the two edge nodes PBB2 and PBB3, instead are pseudo address information of PBB2 and PBB3. In that case, it needs to configure mapping relationship between respective real addresses and pseudo addresses at external network network interfaces (E-NNI) for PBB2 and PBB3, and such mapping relationship is usually configured on the basis of the I-TAG carried in a message. Then, the addresses in the outer MAC header must be translated and replaced (translated between the pseudo addresses and the real address) on PBB2 and PBB3 respectively. It can be seen that, to establish an inter-domain path between a plurality of provider Ethernet networks for data packets, it needs to perform address replacement at edge nodes, and mapping relationship must be determined to accomplish the replacement process. However, the establishment of such mapping relationship needs to be implemented by means of complex configuration when a service is established. Furthermore, since length that needs to be matched is long (at least including I-TAG, real addresses and pseudo addresses), it is difficult for the looking up of a table to be implemented by means of hardware.

SUMMARY OF THE INVENTION

The present invention provides a method and a system for forwarding data between a plurality of provider Ethernet networks, which neither lowers the forwarding efficiency, nor needs to establish an inter-domain path by means of complex configuration when transmitting data between a plurality of PBBNs.

The present invention provides a method for forwarding data between a plurality of provider Ethernet networks, wherein a first provider Ethernet network is the first provider Ethernet network in a path through which a first data packet is transmitted from a first client network to a second client network, and a second provider Ethernet network is the last provider Ethernet network in the path through which the first data packet is transmitted. The method includes using a network address of the first provider Ethernet network and a network address of the second provider Ethernet network as a source address and a destination address of an outer MAC header with which the first data packet is encapsulated when the first data packet is transmitted between the first provider Ethernet network and the second provider Ethernet network; and decapsulating, by the second provider Ethernet network, the first data packet and forwarding the decapsulated data packet to the second client network after the first data packet is forwarded to the second provider Ethernet network.

The present invention further provides a system for forwarding data between a plurality of provider Ethernet networks. The system includes a first provider Ethernet network connected to a first client network and a second provider Ethernet network connected to a second client network, wherein the first provider Ethernet network is the first provider Ethernet network in a path through which a first data packet is transmitted from the first client network to the second client network, and the second provider Ethernet network is the last provider Ethernet network in the path through which the first data packet is transmitted. The first provider Ethernet network includes a first outer MAC header processing unit adapted to encapsulate the first data packet with an outer MAC header according to a network address of the first provider Ethernet network and a network address of the second provider Ethernet network; and a forwarding unit adapted to forward the first data packet processed by the first outer MAC header processing unit towards the second provider Ethernet network. The second provider Ethernet network includes a second outer MAC header processing unit adapted to decapsulate the outer MAC header of the first data packet from the first provider Ethernet network; and a second forwarding unit adapted to forward the first data packet processed by the second outer MAC header processing unit to the second client network.

The present invention further provides a system for forwarding data between a plurality of provider Ethernet networks. The system includes a first provider Ethernet network connected to a first client network and a second provider Ethernet network connected to a second client network, wherein the first provider Ethernet network is the first provider Ethernet network in a path through which a first data packet is transmitted from the first client network to the second client network, and the second provider Ethernet network is the last provider Ethernet network in the path through which the first data packet is transmitted. An edge node of the provider Ethernet network includes a mapping relationship storage unit adapted to store mapping relationship between a client source address and a source address of an outer MAC header of the first data packet received by the edge node; and an outer MAC header processing unit adapted to replace the source address and a destination address of the outer MAC header of the first data packet according to mapping information provided by the mapping relationship storage unit. The outer MAC header processing unit at an egress node of the first provider Ethernet network is adapted to replace the source address of the outer MAC header of the first data packet with a network address of the first provider Ethernet network. The outer MAC header processing unit at an ingress node of the second provider Ethernet network is adapted to query and obtain an address of an egress node of the second provider Ethernet network corresponding to the client destination address of the first data packet according to information provided by the mapping relationship storage unit, and to replace the source address and the destination address of the outer MAC header of the first data packet with the address of the ingress node of the second provider Ethernet network and the address of an egress node of the second provider Ethernet network.

It can be seen from the above description of the embodiments of the present invention that, when a data packet is forwarded between different provider Ethernet networks, the network addresses of the first provider Ethernet network and the last provider Ethernet network in the transmission path are used as the B-SA and B-DA in the outer MAC header of the data packet. Then, the data packet is decapsulated by the last provider Ethernet network and forwarded to the destination client network. Therefore, on the one hand, it only needs to be encapsulated with a single layer of MAC header according to the present invention, which will not lower the forwarding efficiency. On the other hand, since the network address of the provider Ethernet network, instead of the addresses of the edge node of the provider Ethernet network and the edge node at the opposite end, are used when the data packet is transmitted between different provider Ethernet networks, it is unnecessary to configure the complex mapping relationship between the real address and the pseudo address for the respective edge nodes, which simplifies the establishment of the inter-domain path and can be achieved easily.

DETAILED DESCRIPTION OF THE EMBODIMENTS

An embodiment of the present invention is applicable to a circumstance where a plurality of PBBNs are interconnected. That is, an embodiment of the present invention provides a method and a system for forwarding data in a network with a plurality of interconnected PBBNs.

A provider assigns a MAC address to each PBBN managed per se as a provider network address. When a data packet is transmitted from a PBBN to another PBBN, the provider network address assigned is used as a source address and a destination address in an outer MAC header. An intermediate node in data packet transmission path establishes a data forwarding table and determines an inter-domain path by means of a self-learning mechanism according to the provider network address, thereby simplifying configuration of the inter-domain path.

Specifically, when a data packet enters a first PBBN from a client network, the data packet is encapsulated with an outer MAC header at an ingress node. A source address in the outer MAC header is the address of the ingress node (specifically, may be the address of the ingress node per se, or the address of an ingress port through which the data packet enters the edge node), and a destination address is the network address of a second PBBN (namely, a PBBN that is directly connected to a destination client network) obtained by looking up a mapping table. When the data packet exits the first PBBN, a B-SA in the data packet is replaced with the network address of the first PBBN at an egress node. When the data packet enters the second PBBN, at the ingress node of the second PBBN, a B-SA in the data packet is replaced with the address of the ingress node of the second PBBN, and a B-DA is replaced with the address of the egress node of the second PBBN corresponding to a C-DA. The address of the ingress node of the second PBBN may be the address of the ingress node per se, or may be the address of a port through which the data packet enters the node. Similarly, the address of the egress node of the second PBBN may be the address of the egress node per se, or may be the address of an egress port through which the data packet is transmitted from the edge node to the destination client network. When the data packet arrives at the egress node of the second PBBN, the data packet is decapsulated to remove the outer MAC header and transmitted to another client network.

Hereunder, an embodiment of the method and system for forwarding data according to the present invention will be described in detail with reference to the accompanying drawings.

Figure 1:
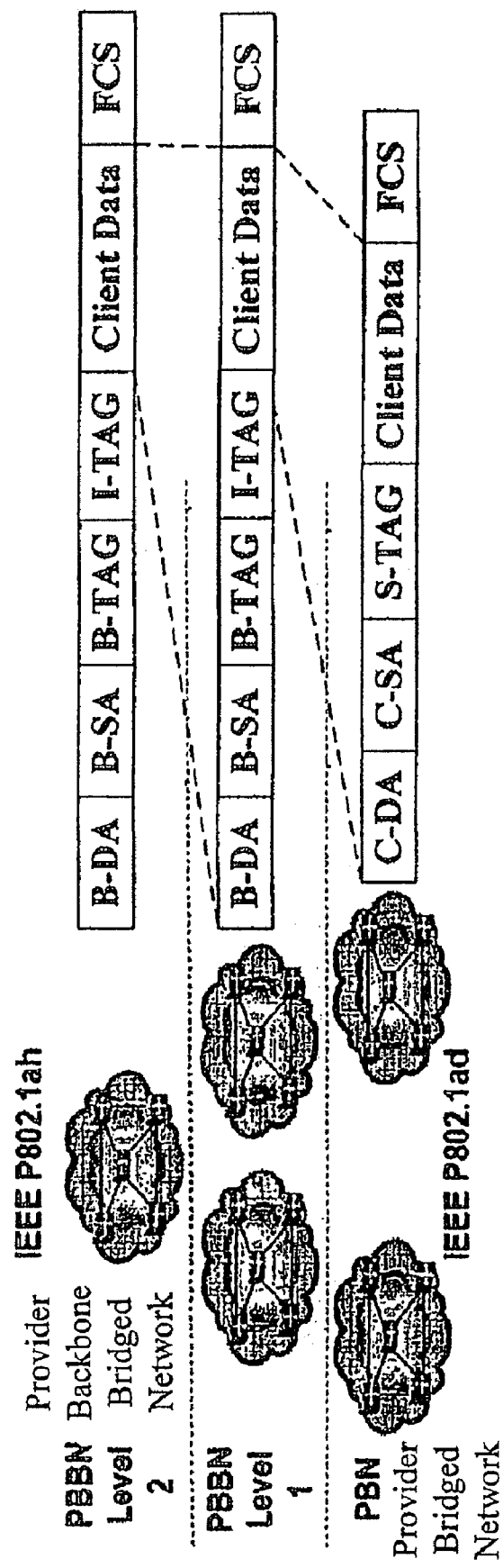
FIG. 1 is a schematic diagram of a tiered-interconnection network model.
Figure 2:
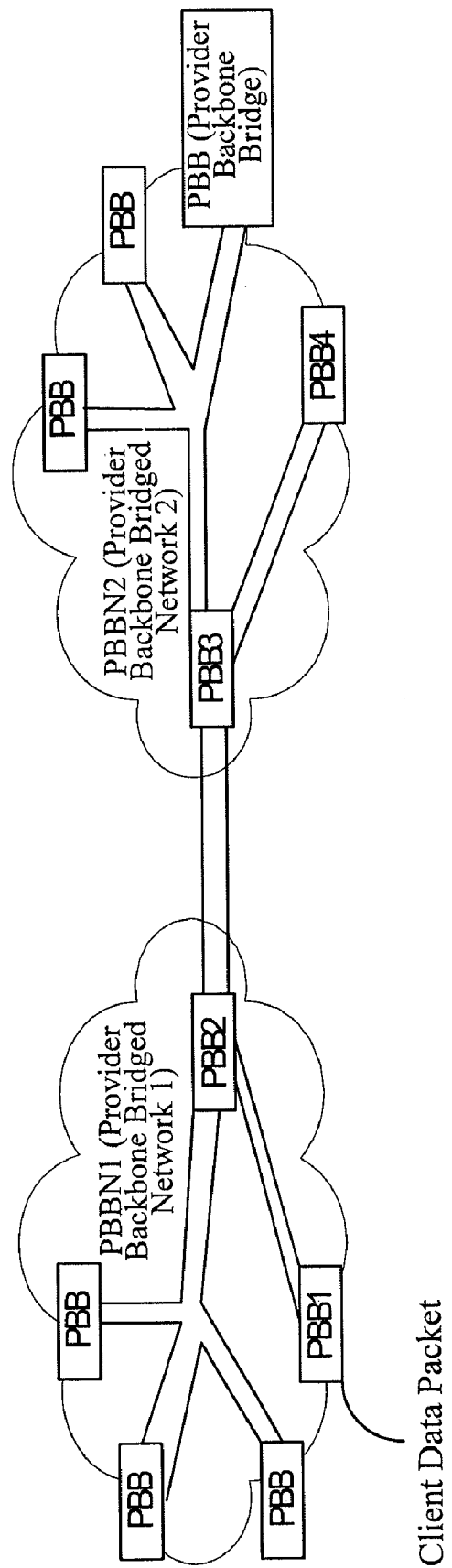
FIG. 2 is a schematic diagram of a peer-to-peer interconnection network model.
Figure 3:
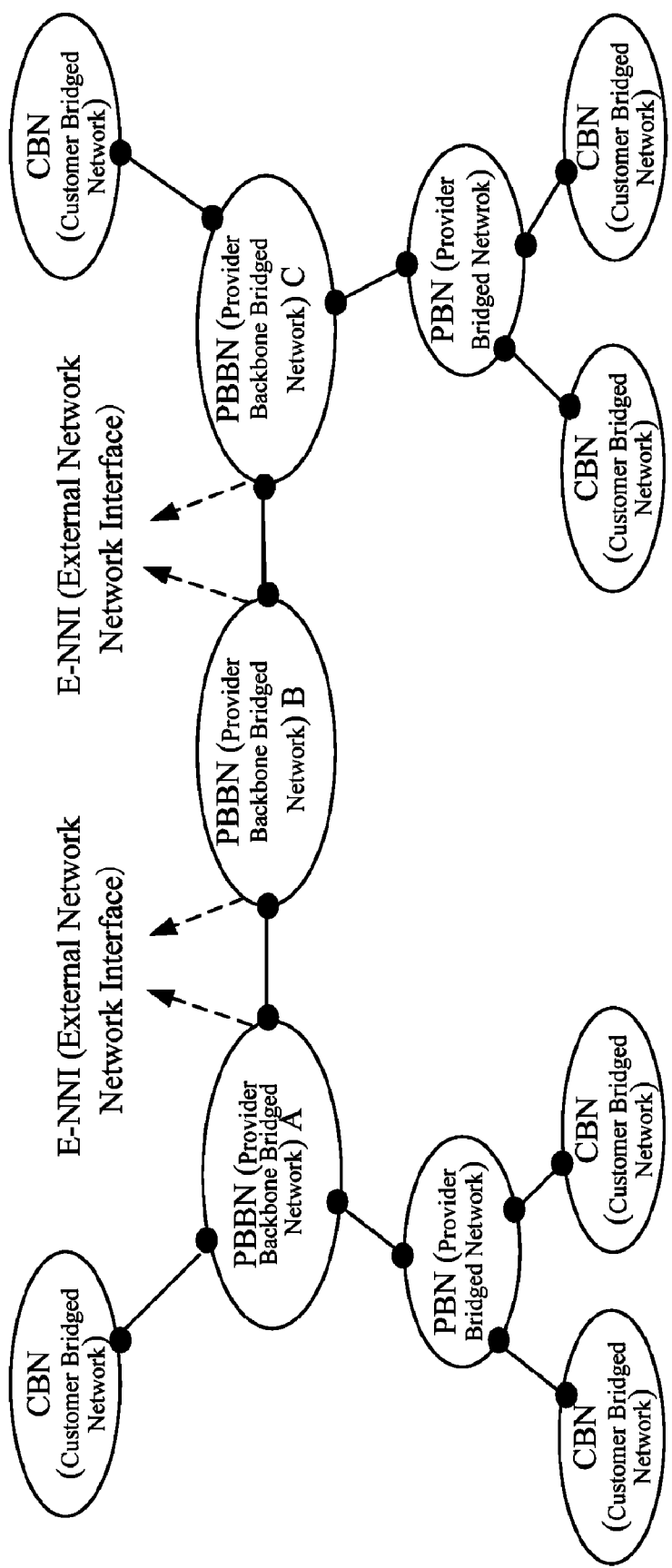
FIG. 3 is a schematic diagram of a network model for forwarding data between a plurality of PBBNs according to an embodiment of the present invention.

A network environment involved in the embodiment of the present invention is shown in FIG. 3. In that network, there are a plurality of PBBNs established on the basis of 802.1ah. Each PBBN may be connected with several PBNs, and each PBN may be connected with several Customer Bridged Networks (CBNs). In addition, a PBBN may also be connected directly with a CBN. Since the embodiment of the present invention focuses on a method for forwarding data between different PBBN domains in a circumstance where a plurality of PBBNs are interconnected, all possible PBNs and CBNs connected to a PBBN may be simplified as CBNs. These CBNs are connected to the PBBN through a User Network Interface (UNI) at the edge nodes of the PBBN, respectively. Different PBBNs are interconnected through an External Network Network Interface (E-NNI) at the respective edge nodes. In the embodiment of the present invention, since simply a data plane upon interconnection between domains is considered, only one path exists between any two networks, which can be implemented by controlling protocol or managing plane, and the specific implementation method is not considered in the present invention.

In order to achieve the object of the embodiment of the present invention, the provider first assigns a MAC address to each PBBN by a network manager as the provider network address. The provider network address can uniquely identify a PBBN domain. A E-NNI interface at an edge nodes of each PBBN is statically configured with the network address of the present PBBN by the network manager. In order to differentiate from a MAC address of a bridge, a part of a MAC address space may be allocated to serve as a network address. For example, a MAC address with first three bytes as "EE-CC-CC" can be allocated as a network address. Any other method can be used as long as a network address can be differentiated from a MAC address of a bridge.

In a network environment where a plurality of PBBNs are interconnected, a PBBN includes a edge node and an intermediate node. The edge node is adapted to encapsulate/decapsulate a data packet with an outer MAC header, to establish mapping relationship between a C-SA and a B-SA, to store the mapping relationship in a mapping table, and to perform operations such as address learning and forwarding table establishment. The intermediate node is adapted to establish a data forwarding table by means of address learning according to a source address and an ingress port in the outer MAC header of the data packet and to forward the data packet according to the data forwarding table.

For a data packet transmission path, an edge node includes an ingress node and an egress node. The ingress node is an edge node through which the data packet enters a PBBN from outside. The egress node is an edge node through which the data packet exits the PBBN from the inside of the PBBN. The intermediate node is a node in the transmission path between the ingress node and the egress node.

Figure 4:
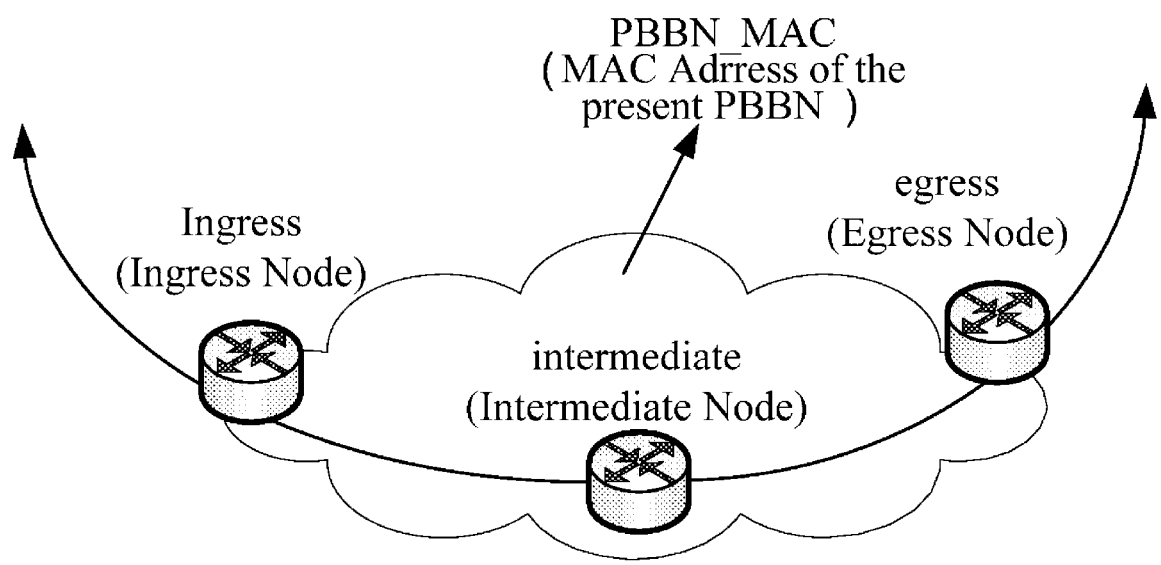
FIG. 4 is a schematic diagram of node types in a PBBN according to an embodiment of the present invention.

With reference to FIG. 4, FIG. 4 describes a PBBN network. PBBN_MAC represents the provider network address corresponding to the PBBN. The lines with an arrow represent the transmission path and transmission direction of the data packet in a PBBN when the data packet is forwarded between a plurality of PBBN domains. Ingress, Egress and Intermediate respectively represent an ingress node, an egress node and an intermediate node corresponding to the service data flow in the PBBN. At Ingress and Egress, external interfaces directed to the present network include a UNI interface and an E-NNI interface, wherein the UNI interface is mainly adapted to handle data exchange with a client, and the E-NNI interface is mainly adapted to handle data exchange with another PBBN network. Usually, no data packet from the client network are received at the E-NNI interface on the ingress node Ingress, otherwise it indicates a wrong configuration. Similarly, the E-NNI interface on the egress node is not connected to the client network; otherwise it indicates a wrong configuration. Similarly, the UNI interface is not connected to another PBBN directly.

Hereunder, the processing flow of the data packet by respective edge nodes of a PBBN in the method for forwarding data according to the present invention will be further described in detail with reference to the accompanying drawings.

Figure 5:
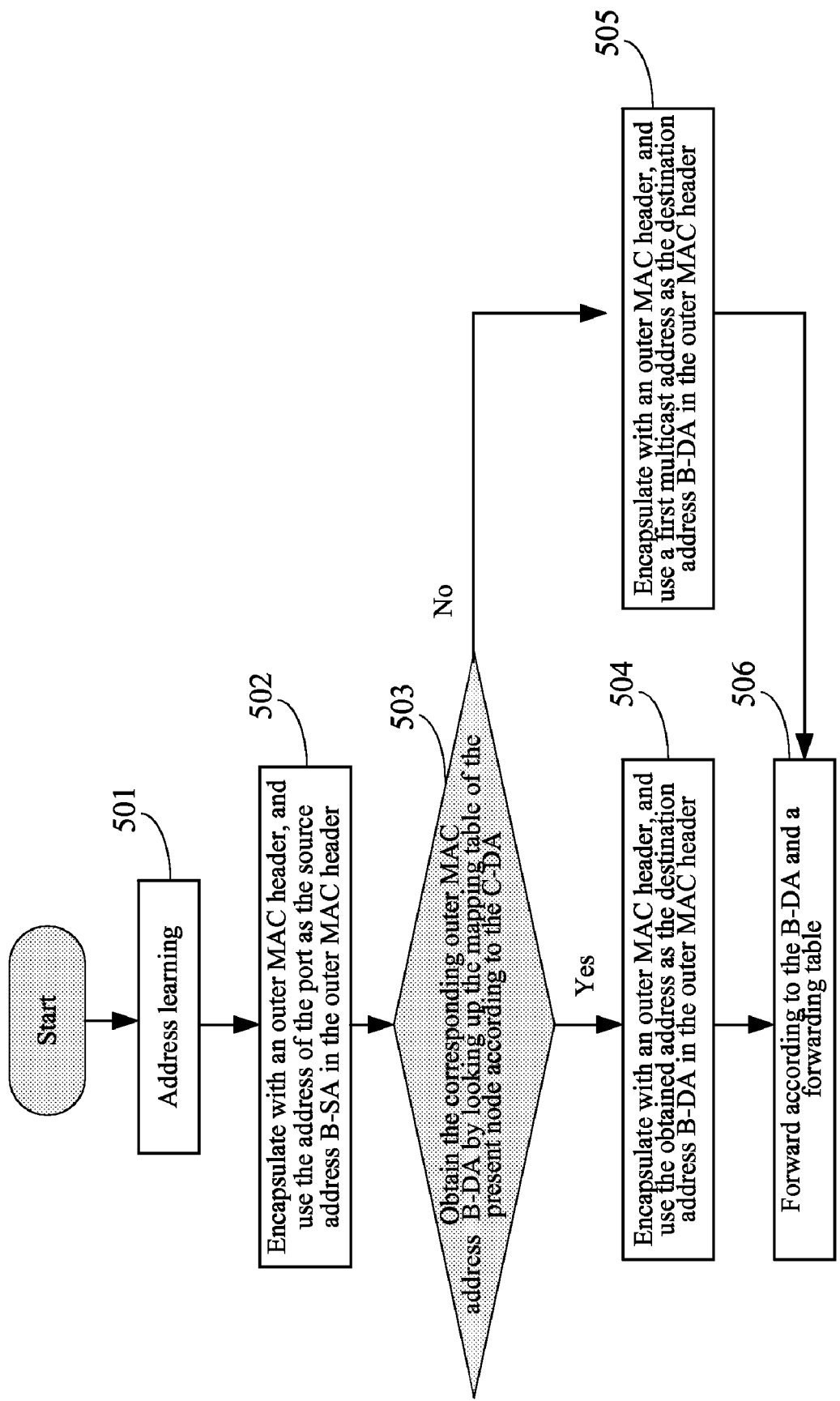
FIG. 5 is a flow diagram for processing a data packet received through a UNI by an ingress node of a PBBN according to an embodiment of the present invention.

At the ingress node (hereinafter referred to as Bridge) of a PBBN, a flow for processing a data packet received through the UNI interface are shown in FIG. 5. A flow for processing a data packet received through the UNI interface by an ingress node will be described in the embodiment. Under normal conditions, the data packet received through the UNI interface can only be a data packet transmitted from the client network. Therefore, the Bridge described in the embodiment is usually an ingress node of a first PBBN into which the data packet from the client network enters. The processing flow shown in FIG. 5 includes the following steps.

In step 501, address learning is carried out, and a data forwarding table is established.

The address learning is to record the mapping relationship between the C-SA and the ingress port for the data packet at the Bridge into a data forwarding table. In this step, the process of the address learning is identical to self-learning mechanism of Ethernet network bridge in the conventional art, and therefore will not be described in detail here.

In step 502, the MAC address of the ingress port through which the data packet enters the Bridge is used as the B-SA for the data packet, namely, the source address of the outer MAC header, and the process proceeds to step 503.

In this step, either the MAC address of the port through which the data packet enters the Bridge or the MAC address of the Bridge can be used as the source address of the outer MAC header.

In step 503, it is determined whether the corresponding B-DA is obtained by looking up the mapping table of the present node according to the C-DA of the data packet. If the B-DA is obtained, the process proceeds to step 504. If the B-DA is not obtained, the process proceeds step 505. As mentioned above, an edge node needs to establish mapping relationship between the C-SA and the B-SA by means of learning and store the mapping relationship in a mapping table. The mapping relationship between the C-SA and the B-SA after learning can be used as the basis for querying the mapping relationship between the C-DA and the B-DA. In other words, after learning, the C-SA corresponds to the C-DA, and the B-SA corresponds to the B-DA. Therefore, the corresponding B-DA can be looked up in the mapping table between the C-SA and the B-SA after learning according to the C-DA in the data packet.

In step 504, the MAC address of the Bridge determined in step 502 is used as the B-SA, the data packet is encapsulated with an outer MAC header by using the B-DA obtained in step 503, and then the process proceeds to step 506.

Since the received data packet may be transmitted to another PBBN or may be transmitted to a Bridge in the present PBBN, the destination MAC address obtained by looking up the mapping table may be the address of a provider backbone bridged network (PBBN) or the MAC address of a bridge or Port in the present PBBN domain. If the B-DA obtained according to the C-DA in step 503 is the network address of a certain PBBN, the PBBN is the PBBN that is directly connected to the destination client network, namely, the last PBBN in the PBBN network in which the data packet is transmitted.

In step 505, the MAC address determined in step 502 is used as the B-SA and a first multicast address is used as the B-DA to encapsulate the data packet with an outer MAC header, and forward the data packet to the present PBBN domain and all other adjacent PBBNs.

In this step, the first multicast address represents the UNI and E-NNI interfaces at other edge nodes within the scope of the present network.

In step 506, an egress port is determined by looking up the data forwarding table according to the B-DA in the data packet, and the data packet is forwarded from the determined egress port. In addition to the learning of the mapping relationship between the C-SA and the B-SA, each edge node carries out the conventional learning the mapping relationship between the MAC address and the port. Therefore, in this step, the egress port can be determined by looking up the data forwarding table according to the B-DA in the data packet.

In the process of encapsulation of the data packet with an outer MAC header as described in steps 504 and 505, it needs to obtain the B-TAG according to the I-TAG in the data packet, and encapsulate with the I-TAG and B-TAG to obtain a complete PBBN data packet format. That process is identical to that in the conventional art, and will not be further described in detail here.

Figure 6:
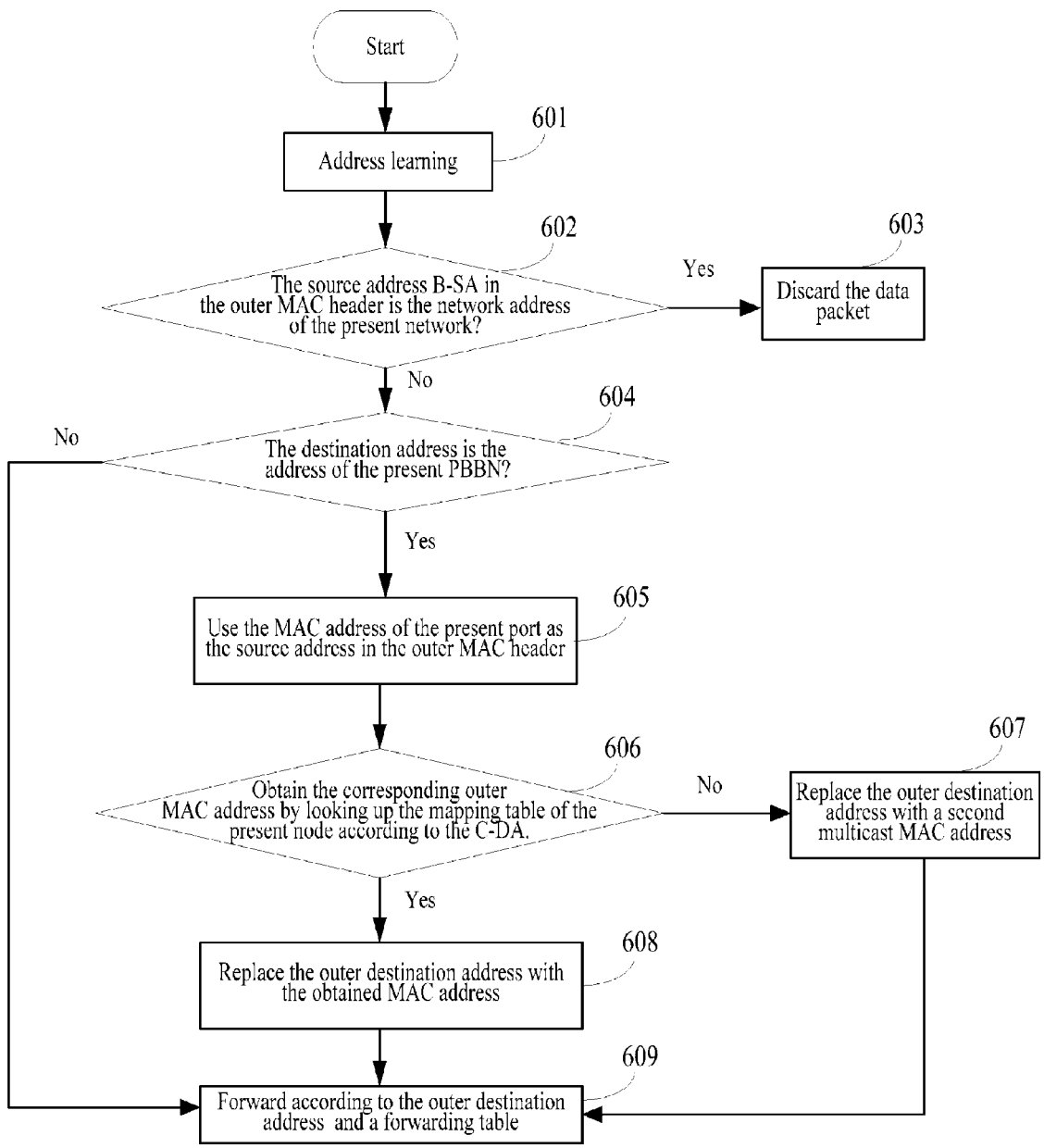
FIG. 6 is a flow diagram for processing a data packet received through an E-NNI by an ingress node of a PBBN according to an embodiment of the present invention.

The flow for processing the data packet at the E-NNI interface of the ingress node Ingress of the PBBN network is shown in FIG. 6. The processing flow described in the embodiment is the flow for processing a data packet received through the E-NNI interface at the ingress node. Under normal conditions, the data packet received from the E-NNI interface is not a data packet transmitted from the client network, but usually is a data packet transmitted from another PBBN network. Therefore, the ingress node described in the embodiment is usually the ingress node of an intermediate PBBN network and the last PBBN network during the transmission of the data packet from the source client network to the destination client network through a plurality of PBBNs. The processing flow shown in FIG. 6 includes the following steps.

In step 601, address learning is carried out and a data forwarding table is established.

The address learning is mainly to record mapping relationship between the C-SA and the ingress port for the data packet at the Bridge into a data forwarding table. In this step, the process of the address learning is identical to the self-learning of Ethernet network bridge in the conventional art, and therefore will not be described in detail here.

In step 602, it is determined whether the B-SA in the data packet is the network address of the present PBBN. If the B-SA is the network address of the present PBBN, the process proceeds to step 603; otherwise the process proceeds to step 604.

In this step, if the B-SA in the data packet received through the ingress node is the network address of the present PBBN, it indicates that the data packet is transmitted from the present PBBN to another PBBN. In this case, a data packet loop is formed between the domains, and therefore the data packet is needed to be discarded.

In step 603, the data packet is discarded.

In step 604, it is determined whether the B-DA in the data packet is the network address of the present PBBN. If the B-DA is the network address of the present PBBN, the process proceeds to step 605; otherwise the process proceeds to step 609.

In step 605, the MAC address of the ingress port (namely, the ingress port through which the data packet enters the Bridge) or the MAC address of the Bridge is used as the source address in the outer MAC header of the data packet (to replace the source address in the original outer MAC header), and the process proceeds to step 606. If it is determined in step 604 that the B-DA is the network address of the present PBBN, usually it indicates that the present PBBN is the last PBBN in the transmission path to the destination client network, that is, the present PBBN is the PBBN that is directly connected to the client network.

In step 606, it is determined whether the corresponding B-DA is obtained by looking up the mapping table of the present node according to the C-DA in the data packet. If the B-DA is obtained, the process proceeds to step 608; otherwise the process proceeds to step 607. As mentioned above, the edge node needs to establish mapping relationship between the C-SA and the B-SA by means of learning and store the mapping relationship in a mapping table. The mapping relationship between the C-SA and the B-SA after learning can be used as the basis for querying the mapping relationship between the C-DA and the B-DA. In other words, after learning, the C-SA corresponds to the C-DA, and the B-SA corresponds to the B-DA. Therefore, the corresponding B-DA can be obtained by looking up the mapping table between the C-SA and B-SA after learning according to the C-DA in the data packet.

In step 607, the B-DA in the data packet is replaced with a second multicast address, and the data packet is encapsulated with an outer MAC header, and then the process proceeds to step 609. In this step, the second multicast address represents the UNI interface of other edge node in the present PBBN domain.

In step 608, the destination address in the outer MAC header of the data packet is replaced with the B-DA obtained in step 606. That is, the B-DA in the outer MAC header of the data packet is changed from the provider network address of the present PBBN to information of the B-DA obtained in step 606. The information of the B-DA after the replacement is usually the address of the egress node through which the data packet is transmitted from the present PBBN to the destination client network (or the address of the egress port through which the data packet is transmitted from the egress node to the client network), and then the process proceeds to step 609.

In step 609, the egress port is determined by looking up the data forwarding table according to the B-DA in the data packet, and the data packet is forwarded through the determined egress port.

If it is determined in step 604 that the B-DA in the data packet is not the network address of the present PBBN and the process proceeds to step 609, it indicates the PBBN (namely, the present PBBN) to which the Bridge belongs is an intermediate PBBN (neither the first PBBN nor the last PBBN) in the transmission path of the data packet. Therefore, the Bridge can forward the data packet directly to a next hop according to the mapping relationship between the MAC address (the B-DA) and the port that is learned in the conventional forwarding table without any processing of the outer MAC header of the data packet. On the contrary, if it is determined in step 604 that the B-DA in the data packet is the network address of the present PBBN and the process proceeds to step 609, it indicates the PBBN (namely, the present PBBN) to which the Bridge belongs is the last PBBN in the transmission path of the data packet. Thus the outer MAC header of the data packet is needed to be processed by step 607 or 608 before the data packet can be forwarded to a next hop in accordance with step 609, and then the data packet is transmitted to the destination client network after the outer MAC header is removed at the egress node of the present PBBN.

As mentioned above, each PBBN has an ingress node, an egress node and an intermediate node. For an intermediate node in a PBBN domain, the process after a message transmitted from the ingress node is received is the same as that defined in 802.1ah and 802.1ad and will not be described here in detail. The process mainly includes the following steps.

In step 1, mapping relationship between the B-SA in the outer MAC header of the data packet and the ingress port for the data packet is recorded in a forwarding table.

In step 2, the forwarding table is looked up to determine the egress port for forwarding the data packet according to the B-DA of the data packet.

In step 3, the data packet is transmitted from the determined egress port.

Figure 7:
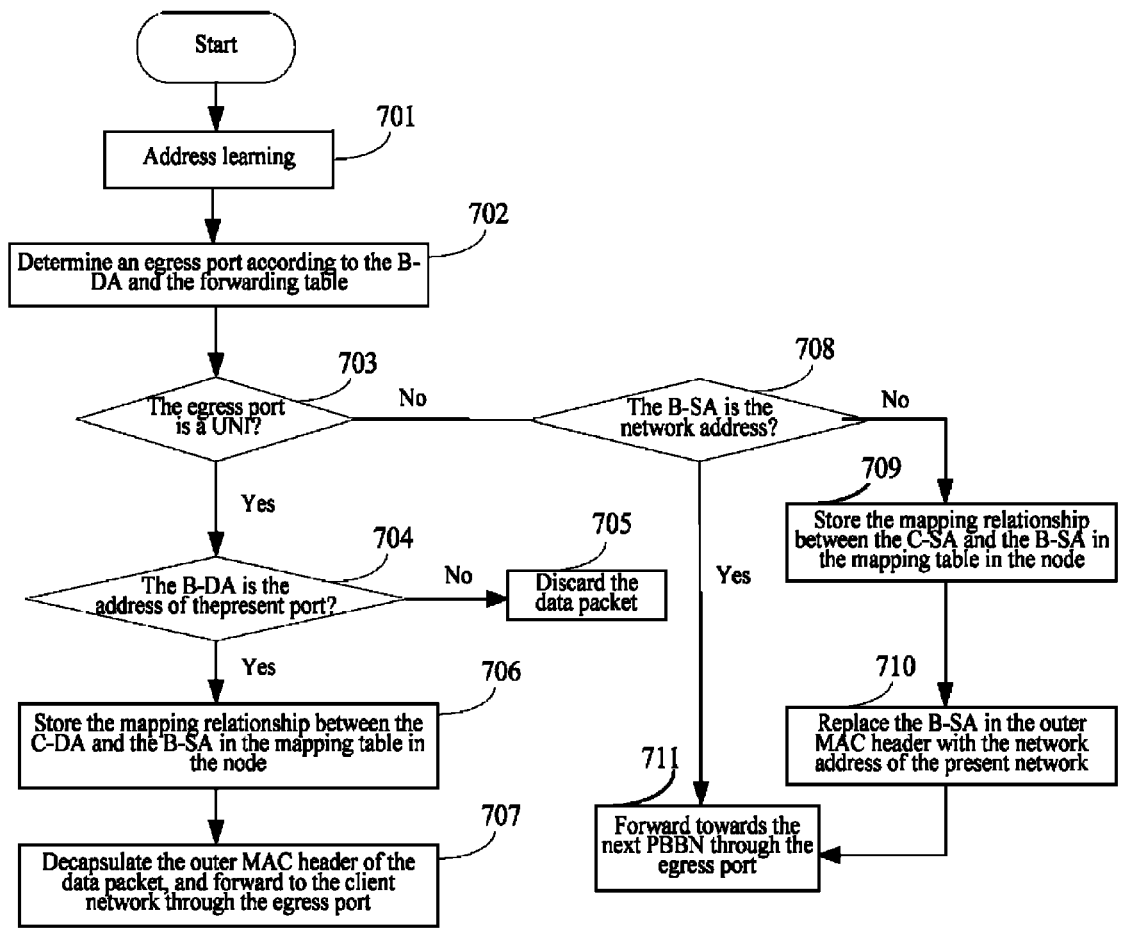
FIG. 7 is a flow diagram for processing a data packet by an egress node of a PBBN according to an embodiment of present invention.

The flow for processing a data packet at an ingress node involved in the embodiment of the present invention are described in detail above with reference to FIG. 5 and FIG. 6. Hereunder, the flow for processing the data packet at an egress node will be described in detail with reference to FIG. 7. The flow for processing the data packet at the egress node of a PBBN domain is shown in FIG. 7. The process includes the following steps.

In step 701, address learning is carried out, and a data forwarding table is established.

In this step, the address learning is to record mapping relationship between the B-SA in the data packet and the ingress port for the data packet in a data forwarding table.

In step 702, the forwarding table is looked up to determine a network egress port for the data packet according to the B-DA in the data packet, and the process proceeds to step 703.

In step 703, it is determined whether the egress port for the data packet is a UNI interface. If the egress port is a UNI interface, the process proceeds to step 704 (it indicates that the PBBN to which the present node belong is the last PBBN in the data packet transmission path); otherwise the process proceeds to step 708 (it indicates the PBBN to which the present node belong is the first PBBN or an intermediate PBBN in the data packet transmission path).

In step 704, it is determined whether the B-DA in the data packet is the address of the egress port determined in step 702 by looking up the forwarding table. If the B-DA is the address of the egress port, the process proceeds to step 706; otherwise the process proceeds to step 705.

In step 705, the data packet is discarded.

In step 706, the mapping relationship between the C-SA and the B-SA in the data packet is stored in the data packet into a mapping table of the present node, and the process proceeds to step 707.

In step 707, the outer MAC header of the data packet is decapsulated, the data forwarding table is looked up according to the client destination address of the data packet to determine a client egress port, and then the data packet is transmitted to the client network through the client egress port.

In step 708, it is determined whether the B-SA in the data packet is the provider network address. If the B-SA is the provider network address, the process proceeds to step 711 (it indicates that the present PBBN is an intermediate PBBN in the data packet transmission path); otherwise the process proceeds to step 709 (it indicates that the present PBBN is the first PBBN in the data packet transmission path).

In step 709, the mapping relationship between the C-SA and the B-SA in the data packet is stored in a mapping table in the present node.

In step 710, the B-SA in the data packet is replaced with the network address of the present PBBN, and then the process proceeds to step 711.

In step 711, the data packet is forward to another PBBN from the network egress port determined in step 702.

While the method for forwarding data between a plurality of PBBNs is described above by means of the embodiments of the present invention, those skilled in the art shall note that a network to which the embodiment of the present invention is applicable include, but not limited to, the fore-mentioned PBBNs, and the present invention can also be applied to a variety of provider Ethernet networks.

Figure 8:
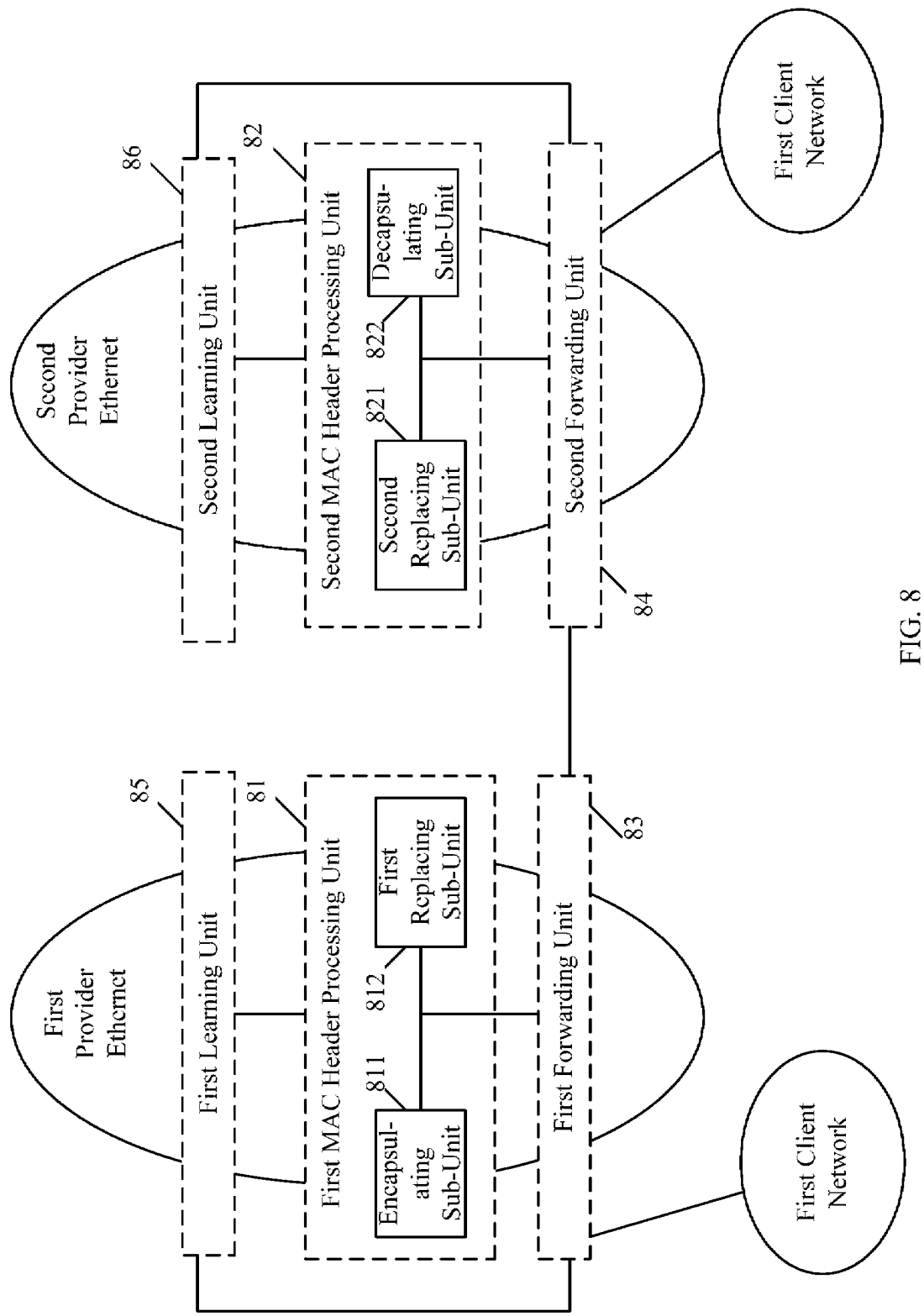
FIG. 8 is a structural representation of an embodiment of a system for forwarding data between a plurality of provider Ethernet networks according to the present invention.

With reference to FIG. 8, FIG. 8 is a structural representation of an embodiment of the system for forwarding data between a plurality of provider Ethernet networks according to the present invention.

The system according to the embodiment includes a first provider Ethernet network connected to a first client network and a second provider Ethernet network connected to a second client network. The first provider Ethernet network is the first provider Ethernet network in a path through which a first data packet is transmitted from the first client network to the second client network, and the second provider Ethernet network is the last provider Ethernet network in the path through which the first data packet is transmitted to the second client network. There is no limitation on whether the first data packet passes another provider Ethernet network (referred to as an intermediate provider Ethernet network) during the transmission of the first data packet forwarded from the first provider Ethernet network to the second provider Ethernet network. Since the intermediate provider Ethernet network determines an inter-domain path by means of an existing self-learning mechanism (usually mapping relationship between a source MAC address and an ingress port), the structure of the intermediate provider Ethernet network will not be described in detail here. Hereunder, the internal structure of the system will be further described in combination with working principle of the system described in the embodiment.

First, when a data packet transmitted from the first client network to the second client network arrives at the first provider Ethernet network, a first MAC header processing unit 81 carries out MAC header encapsulation and replacement for the data packet according to a network address of the first provider Ethernet network and a network address of the second provider Ethernet network. For the convenience of description, hereinafter the data packet is referred to as a first data packet. Specifically, first, an encapsulating sub-unit 811 at an ingress node of the first provider network encapsulates the first data packet with an outer MAC header. An address of the ingress node is used as the source address in the outer MAC header and the network address of the second provider Ethernet network is used as the destination address in the outer MAC header. Next, a first forwarding unit 83 forwards the first data packet encapsulated with the outer MAC header to an egress node. Then, a first replacing sub-unit 812 at the egress node replaces the source address in the outer MAC header of the first data packet that is processed by the encapsulating sub-unit 811. The destination address in the outer MAC header keeps unchanged, and the source address is replaced with the network address of the first provider Ethernet network. Then, the first forwarding unit 83 forwards the first data packet processed by the first replacing sub-unit 812 to the second provider Ethernet network.

Now, the transmission process for the first data packet in the first provider Ethernet network is completed. It shall be noted that, in the first provider Ethernet network, a first learning unit 85 is further included. Similar to the first forwarding unit 83, the first learning unit 85 is disposed at respective edge nodes of the provider Ethernet network. Specifically, the first learning unit 85 includes two learning sub-units. One of the two learning sub-units is configured to learn mapping relationship between a client source address and an ingress port in the data packet received at the present node. The other of the two learning sub-units is configured to learn the client source address and the source address in the outer MAC header in the received data packet. The first learning unit 85 provides required information for the first MAC header processing unit 81 and the first forwarding unit, respectively. For example, the first learning unit 85 can provide the network address of the second provider Ethernet network for the encapsulating sub-unit 811. That is, the first learning unit 85 queries the mapping relationship learned by the first learning unit 85 for the network address of the corresponding second provider Ethernet network according to the client source address of the first data packet. In addition, the first learning unit 85 can provide forwarding path information for the first forwarding unit 83 according to the mapping relationship between the client source address and the ingress port that is learned by the learning unit. Since the first forwarding unit 83 and a second forwarding unit 84 that will be described hereunder can carry out forwarding by means of the existing self-learning mechanism, the forwarding process will not be described in detail here.

When the first data packet processed by the first MAC header processing unit 81 in the first provider Ethernet network arrives at the second provider Ethernet network, a second MAC header processing unit 82 carries out replacement and decapsulation for the MAC header. Specifically, first, a second replacing sub-unit 821 at an ingress node of the second provider Ethernet network replaces the outer MAC header of the first data packet from the first provider Ethernet network. The source address in the outer MAC header after replacement is the address of the ingress node of the second provider Ethernet network, and the destination address is the address of an egress node of the second provider Ethernet network. Next, a second forwarding unit 84 forwards the first data packet encapsulated with the outer MAC header to the egress node of the second provider Ethernet network. Then, a decapsulating sub-unit 822 at the egress node of the second provider Ethernet network carries out decapsulation for the outer MAC header of the first data packet that is processed by the second replacing sub-unit 821, thereby an inner MAC header of the first data packet is obtained. Finally, after the decapsulating sub-unit 822 removes the outer MAC header from the first data packet, the second forwarding unit 84 forwards the first data packet to the second client network. In the second provider Ethernet network, a second learning unit 86 which provides required information for the second MAC header processing unit 82 and the second forwarding unit 84 is included. Since the second learning unit 86 is implemented in the same principle as the first learning unit 85, it will not be described again here.

The first provider Ethernet network and the second provider Ethernet network described above each have a network address. In the system according to the embodiment, a network address assigning unit can be used to assign a network address to each provider network and inform respective edge nodes at the provider Ethernet network. Of course, the network address of each provider Ethernet network can also be configured at an edge node of the provider Ethernet network manually. According to another aspect of the present invention, the present invention further provides an embodiment of another system for forwarding data between Ethernet networks of a plurality of provider. The system according to the embodiment includes a first client network, a second client network, a first provider Ethernet network, and a second provider Ethernet network. The first client network is connected to the first provider Ethernet network, and the second client network is connected to the second provider Ethernet network. The first provider Ethernet network and the second provider Ethernet network are connected to each other directly or via other provider Ethernet network (referred to as an intermediate provider Ethernet networks).

An edge node of the provider Ethernet network includes a mapping relationship storage unit and an outer MAC header processing unit. The mapping relationship storage unit is adapted to store the mapping relationship between the client source address and the source address in the outer MAC header in the data packet received by the present node. Specifically, the mapping relationship storage unit can record the mapping relationship by means of a mapping table. The outer MAC header processing unit is adapted to replace the source address and the destination address in the outer MAC header of the data packet according to the mapping information provided by the mapping relationship storage unit. If the first client network is to transmit a data packet (for the convenience of description, hereinafter is referred to as a first data packet) to the second client network, the first data packet at least passes through the first provider Ethernet network and the second provider Ethernet network (and may passes through an intermediate provider Ethernet network between the first provider Ethernet network and the second provider Ethernet network). The outer MAC header processing unit at the egress node of the first provider Ethernet network is adapted to replace the source address in the outer MAC header of the data packet with the network address of the first provider Ethernet network. The outer MAC header processing unit at the ingress node of the second provider Ethernet network is adapted to query and obtain the address of the egress node of the second provider Ethernet network corresponding to the client destination address of the data packet according to the information provided by the mapping relationship storage unit, and to replace the source address and the destination address in the outer MAC header of the data packet with the address of the ingress node and the address of the egress node of the second provider Ethernet network.

In addition, the edge node further includes an encapsulating unit that is adapted to encapsulate the data packet transmitted from the client network with an outer MAC header and provide the data packet to the outer MAC header processing unit for use. Specifically, the encapsulating unit is the first encapsulating unit at the ingress node of the first provider Ethernet network, which is adapted to use the address of the present node and the network address of the second provider Ethernet network as the source address and the destination address of the outer MAC header and encapsulate the first data packet with the outer MAC header.

Of course, the edge node further includes a decapsulating unit, which is adapted to decapsulate the data packet transmitted from the client network and processed by the by the outer MAC header processing unit to remove the outer MAC header.

The edge node further includes a forwarding relationship storage unit, which is adapted to store mapping relationship between the source address in the outer MAC header and an ingress port of the received data packet. Specifically, the mapping relationship storage unit can record the mapping relationship by means of a mapping table.

The edge node further includes a forwarding unit, which is adapted to look up the mapping relationship provided from the forwarding relationship storage unit and determine an egress port according to the destination address of the data packet, and to transmit the data packet that is encapsulated with the outer MAC header or decapsulated the outer MAC header through the egress port.

Furthermore, the edge node further includes a network address acquiring unit, which is adapted to acquire the network address of the provider Ethernet network at the present node.

It can be seen from the embodiments described above that, the embodiments of the present invention utilize a network address of a provider Ethernet network as an outer MAC header for data packet transmission between different provider Ethernet networks without involving an address of a specific edge node. Therefore, it is unnecessary to configure complex address mapping relationship at respective edge nodes. An inter-domain path can be established simply by means of a self-learning mechanism to achieve transmission between domains, so that a data packet from a source client network is forwarded to a destination client network.

In addition, since the network address of the provider Ethernet network used during the inter-domain transmission instead of the address of the specific edge node is used as an outer MAC header for the data packet during the inter-domain transmission, an address of a specific network device (such as an edge node device) inside the provider Ethernet network is not exposed to any other provider Ethernet network, which enhances network security.

Moreover, in the embodiments of the present invention, a data packet from a client is encapsulated with only one layer of MAC header so that forwarding between different provider Ethernet networks, which increases forwarding efficiency.

The preferred embodiments of the present invention have been described above, and the scope of protection of the present invention is not limited thereto. Any modifications and equivalent substitutions which can be easily conceived by those skilled in the art within the technical scope of the disclosure of the present invention should be encompassed by the scope of protection of the present invention.

What is claimed is:

1. A method for forwarding data between a plurality of provider Ethernet networks, wherein a first provider Ethernet network is the first provider Ethernet network in a path through which a first data packet is transmitted from a first client network to a second client network, and a second provider Ethernet network is the last provider Ethernet network in the path through which the first data packet is transmitted, wherein the method comprises:

encapsulating, by an ingress node of the first provider Ethernet network, the first data packet with an outer MAC header by using a network address of the second provider Ethernet network as a destination address in the outer MAC header, and then forwarding the first data packet to an egress node of the first provider Ethernet network; and replacing, by the egress node of the first provider Ethernet network, a source address of the outer MAC header of the first data packet with the network address of the first provider Ethernet network, and forwarding the first data packet to the second provider Ethernet network; and decapsulating, by the second provider Ethernet network, the first data packet and forwarding the decapsulated data packet to the second client network after the first data packet is forwarded to the second provider Ethernet network.

2. The method according to claim 1, wherein the decapsulating the first data packet and forwarding the first data packet to the second client network after the first data packet is forwarded to the second provider Ethernet network comprises:

replacing, by an ingress node of the second provider Ethernet network, the source address and the destination address of the outer MAC header of the first data packet with an address of the ingress node and an address of an egress node of the second provider Ethernet network, and forwarding the first data packet to the egress node of the second provider Ethernet network after receiving the first data packet; and decapsulating, by the egress node of the second provider Ethernet network, the outer MAC header of the first data packet, and forwarding the first data packet to the second client network.

3. The method according to claim 1, wherein processing of the first data packet by the ingress node of the first provider Ethernet network comprises:

when the ingress node of the first provider Ethernet network acquires the network address of the corresponding second provider Ethernet network by querying learned mapping relationship according to client destination address in the first data packet, encapsulating the first data packet with the outer MAC header by using the address of the ingress node of the first provider Ethernet network and the network address of the second provider Ethernet network as the source address and the destination address respectively, and then forwarding the first data packet to the egress node of the first provider Ethernet network; and when the ingress node of the first provider Ethernet network cannot acquire the network address of the second provider Ethernet network corresponding to the client destination address by querying the learned mapping relationship according to the client destination address of the first data packet, encapsulating the first data packet with the outer MAC header by using the address of the ingress node and a first multicast address of the first provider Ethernet network as the source address and destination address, and forwarding the first data packet encapsulated with the outer MAC header to other provider Ethernet networks connected to the first provider Ethernet network, wherein the first multicast address points to a user network interface and an external network network interface of the first provider Ethernet network.

4. The method according to claim 1, wherein processing of the first data packet by the egress node of the first provider Ethernet network treats comprises:

determining, by the egress node of the first provider Ethernet network, a forwarding egress port for the data packet according to the destination address of the outer MAC header of the first data packet;

judging that the forwarding egress port is an external network interface and the source address of the outer MAC header of the first data packet is not within network address scope of the first provider Ethernet network; and replacing the source address of the outer MAC header of the first data packet with the network address of the first provider Ethernet network, and forwarding the first data packet towards the second provider Ethernet network.

5. The method according to claim 2, wherein the replacing and the forwarding by the ingress node of the second provider Ethernet network comprises:

if the ingress node of the second provider Ethernet network determines that the destination address of the outer MAC header of the first data packet is the network address of the second provider Ethernet network, when the address of the egress node of the second provider Ethernet network corresponding to the client destination address is acquired by querying learned mapping relationship according to the client destination address in the first data packet, replacing the source address and the destination address of the outer MAC header of the first data packet with the address of the ingress node and the address of the egress node of the second provider Ethernet network, and then forwarding the first data packet to the egress node of the second provider Ethernet network;

when the ingress node of the second provider Ethernet network cannot acquire the address of the egress node of the corresponding second provider Ethernet network by querying the learned mapping relationship according to the client destination address of the first data packet, using a second multicast address as the destination address of the outer MAC header of the first data packet and forwarding the first data packet to the client network connected to the second provider Ethernet network, wherein the second multicast address points to the user network interface of the second provider Ethernet network; and if the ingress node of the second provider Ethernet network determines that the destination address of the outer MAC header of the first data packet is not the network address of the second provider Ethernet network, looking up a forwarding table according to the destination address of the outer MAC header of the first data packet to determine an egress port, and forwarding the first data packet through the egress port.

6. The method according to claim 2, wherein the decapsulating and forwarding the first data packet by the egress node of the second provider Ethernet network comprises:

looking up, by the egress node of the second provider Ethernet network, a forwarding table according to the destination address of the outer MAC header of the first data packet to determine an egress port; and decapsulating the outer MAC header of the first data packet and forwarding the first data packet to the second client network, if the egress port is a user network interface and the destination address of the outer MAC header is a MAC address of the egress port or the MAC address of the egress node.

7. The method according to claim 1, wherein the method further comprises:

learning, by edge nodes of each of the provider Ethernet networks, the mapping relationship between the client source address and the source address of the outer MAC header of the received data packet, wherein the mapping relationship at least provides network address information of the provider Ethernet network corresponding to the destination client address for transmission between different provider Ethernet networks.

8. The method according to claim 1, wherein the network address of the provider Ethernet network is configured statically by a network manager to edge nodes of the provider Ethernet networks.

9. The method according to claim 1, wherein if the first data packet further passes at least one intermediate provider Ethernet network between the first provider Ethernet network and the second provider Ethernet network during transmission of the first data packet forwarded from the first client network to the second client network, the method further comprises: determining, by the intermediate provider Ethernet network, an inter-domain path by means of a self-learning mechanism.

10. A system for forwarding data between a plurality of provider Ethernet networks comprising a first provider Ethernet network connected to a first client network and a second provider Ethernet network connected to a second client network, wherein the first provider Ethernet network is the first provider Ethernet network in a path through which a first data packet is transmitted from the first client network to the second client network, and the second provider Ethernet network is the last provider Ethernet network in the path through which the first data packet is transmitted, wherein the first provider Ethernet network comprises:
a first outer MAC header processing unit configured to encapsulate the first data packet with an outer MAC header according to a network address of the first provider Ethernet network and a network address of the second provider Ethernet network; and
a forwarding unit configured to forward the first data packet processed by the first outer MAC header processing unit towards the second provider Ethernet network, wherein the first outer MAC header processing unit further comprises:
an encapsulating sub-unit at an ingress node of the first provider Ethernet network, configured to encapsulate the first data packet with the outer MAC header, wherein a source address of the encapsulated outer MAC header is an address of the ingress node, and a destination address of the encapsulated outer MAC header is the network address of the second provider Ethernet network; and
a first replacing sub-unit at an egress node of the first provider Ethernet network, configured to replace the source address of the outer MAC header of the first data packet processed by the encapsulating sub-unit, wherein the source address of the outer MAC header after the replacement is the network address of the first provider Ethernet network;

the second provider Ethernet network comprises:
a second outer MAC header processing unit configured to decapsulate the outer MAC header of the first data packet from the first provider Ethernet network; and
a second forwarding unit configured to forward the first data packet processed by the second outer MAC header processing unit to the second client network.

11. The system according to claim 10, wherein the second outer MAC header processing unit comprises:
a second replacing sub-unit at an ingress node of the second provider Ethernet network, configured to replace the outer MAC header of the first data packet from the first provider Ethernet network, wherein the source address of the outer MAC header after the replacement is an address of the ingress node of the second provider Ethernet network, and the destination address of the outer MAC header is an address of an egress node of the second provider Ethernet network; and
a decapsulating sub-unit in the egress node of the second provider Ethernet network, configured to decapsulate the outer MAC header of the first data packet processed by the second replacing sub-unit.

12. The system according to claim 10, wherein the first provider Ethernet network and the second provider Ethernet network each further comprise a learning unit at respective edge nodes of the provider networks, respectively, configured to provide address information required for processing the first data packet to rest units by carrying out address learning for the received first data packet.

13. The system according to claim 12, wherein the learning unit comprises:
a first learning sub-unit, configured to learn mapping relationship between a client source address and an ingress port of the received first data packet; and
a second learning sub-unit, configured to learn mapping relationship between the client source address and the source address of the outer MAC header of the received first data packet.

14. The system according to claim 13, wherein the learning unit provides the network address of the second provider required for encapsulating the first data packet with the outer MAC header for the first outer MAC header processing unit.

15. The system according to claim 10, wherein the system further comprises a network address assigning unit, configured to assign a network address to each of the provider Ethernet networks and inform the edge nodes of the corresponding provider Ethernet network.

16. A system for forwarding data between a plurality of provider Ethernet networks comprising a first provider Ethernet network connected to a first client network and a second provider Ethernet network connected to a second client network, wherein the first provider Ethernet network is the first provider Ethernet network in a path through which a first data packet is transmitted from the first client network to the second client network, and the second provider Ethernet network is the last provider Ethernet network in the path through which the first data packet is transmitted, wherein an edge node of the provider Ethernet network comprises:
a mapping relationship storage unit configured to store mapping relationship between a client source address and a source address of an outer MAC header of the first data packet received by the edge node; and
an outer MAC header processing unit configured to replace the source address and a destination address of the outer MAC header of the first data packet according to mapping information provided by the mapping relationship storage unit;
the outer MAC header processing unit at an egress node of the first provider Ethernet network is configured to replace the source address of the outer MAC header of the first data packet with a network address of the first provider Ethernet network; and
the outer MAC header processing unit at an ingress node of the second provider Ethernet network is configured to query and obtain an address of an egress node of the second provider Ethernet network corresponding to the client destination address of the first data packet according to information provided by the mapping relationship storage unit, and to replace the source address and destination address of the outer MAC header of the first data packet with the address of the ingress node of the second provider Ethernet network and the address of an egress node of the second provider Ethernet network.

17. The system according to claim 16, wherein the edge node of the provider Ethernet network further comprises:
an encapsulating unit configured to encapsulate the first data packet transmitted from a client network with the outer MAC header and to provide the first data packet to the outer MAC header processing unit;
a decapsulating unit configured to decapsulate the outer MAC header of the first data packet that is transmitted to the client network and processed by the outer MAC header processing unit;
a forwarding relationship storage unit configured to store mapping relationship between the source address and an ingress port of the first data packet received by the edge node; and
a forwarding unit configured to query the information provided by the forwarding relationship storage unit according to the destination address of the first data packet to determine the egress port, and to forward the first data packet that is encapsulated with the other MAC header or decapsulated the outer MAC header through the egress port.

18. The system according to claim 17, wherein the encapsulating unit is a first encapsulating unit at the ingress node of the first provider Ethernet network, which is configured to use the address of the edge node and the network address of the second provider Ethernet network as the source address and the destination address of the outer MAC header to encapsulate the first data packet with the outer MAC header.

* * * * *